(12) United States Patent
Nalawadi

(10) Patent No.: US 6,772,266 B2
(45) Date of Patent: Aug. 3, 2004

(54) DETECTING TRANSFER OF UNIVERSAL SERIAL BUS (USB) HOST CONTROLLER INFORMATION FROM OPERATING SYSTEM DRIVERS TO BASIC INPUT OUTPUT SYSTEM (BIOS)

(75) Inventor: Rajeev K. Nalawadi, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 476 days.

(21) Appl. No.: 09/895,688

(22) Filed: Jun. 29, 2001

(65) Prior Publication Data

US 2003/0005203 A1 Jan. 2, 2003

(51) Int. Cl.[7] .......................... G06F 9/48; G06F 13/00
(52) U.S. Cl. .................. 710/305; 709/100; 709/301
(58) Field of Search ............................... 710/305, 262, 710/200, 100, 313; 709/100, 102, 301, 302; 714/4; 711/200; 345/734; 713/2

(56) References Cited

U.S. PATENT DOCUMENTS 5,933,611 A * 8/1999 Shakkarwar ................ 710/100
6,119,190 A * 9/2000 Garney ...................... 710/310
6,349,354 B1 * 2/2002 Garney ...................... 710/313
6,606,674 B1 * 8/2003 Howard ..................... 710/100

OTHER PUBLICATIONS

"Embedded application design using a real–time OS" by Stepner, D.; Rajan, N. and Hui, D. (abstract only).*

"resource management of the OS network subsystem" by Ghosh, S. and Rajkumar, R. R. (abstract only).*

Intel, Mar. 1996, Universal Host Controller Interface (UHCI) Design Guide, Intel Corporation.

* cited by examiner

Primary Examiner—Gopal C. Ray
(74) Attorney, Agent, or Firm—Blakely, Sokoloff, Taylor & Zafman LLP

(57) ABSTRACT

A first driver bypasses execution of a transaction descriptor that causes a non-maskable interrupt (NMI) when executed by a host controller while under control of a second driver. The transaction descriptor is pointed to by an entry in a frame list. The host controller has a plurality of host controller registers including a frame list base address register defining a base address of the frame list and a frame number register addressing the entry.

40 Claims, 5 Drawing Sheets

DETECTING TRANSFER OF UNIVERSAL SERIAL BUS (USB) HOST CONTROLLER INFORMATION FROM OPERATING SYSTEM DRIVERS TO BASIC INPUT OUTPUT SYSTEM (BIOS)

BACKGROUND

1. Field of the Invention

This invention relates to Universal Serial Bus (USB). In particular, the invention relates to USB Host Controllers.

2. Description of Related Art

The Universal Serial Bus (USB) is an industry standard extension to the Personal Computer (PC) architecture with focus on PC peripherals. The USB supports functional data and control exchange between the USB host and a USB device as a set of either unidirectional or bi-directional pipes. USB data transfers take place between host software and a particular endpoint on a USB device. The USB host interacts with USB devices through a USB Host Controller (HC). The USB system software on the host manages interactions between USB devices and host-based device software.

The USB system software includes USB drivers, client driver software, and HC driver. In a typical PC environment, the USB drivers may exist in the Basic Input/Output System (BIOS) and the Operating System (OS). When control is transferred from the USB HC from the BIOS device driver to the OS device driver, the OS device driver saves a snapshot of all the USB input/output (I/O) registers. The OS driver will restore the snapshot of these USB I/O registers when the user wishes to perform one of the following tasks: (1) restart to Microsoft-Disk Operating System (MS-DOS), (2) select "Shutdown of OS", and (3) unload OS USB drivers using device manager in the OS.

The BIOS needs to determine when the transfer of control from the OS driver to the BIOS is completed. Existing techniques include use of the Configure Flag (CF). The USB HC driver sets this bit as the last action in its process of configuring the Host Controller. However, the OS device driver will have re-enumerated the USB devices and assigned new addresses. Therefore, restoring the USB I/O registers will not restore the BIOS Legacy functionality.

Therefore, there is a need to have an efficient technique to detect when the control transfer from OS device driver to BIOS is completed.

BRIEF DESCRIPTION OF THE DRAWINGS

The features and advantages of the present invention will become apparent from the following detailed description of the present invention in which.

DESCRIPTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Figure 1:
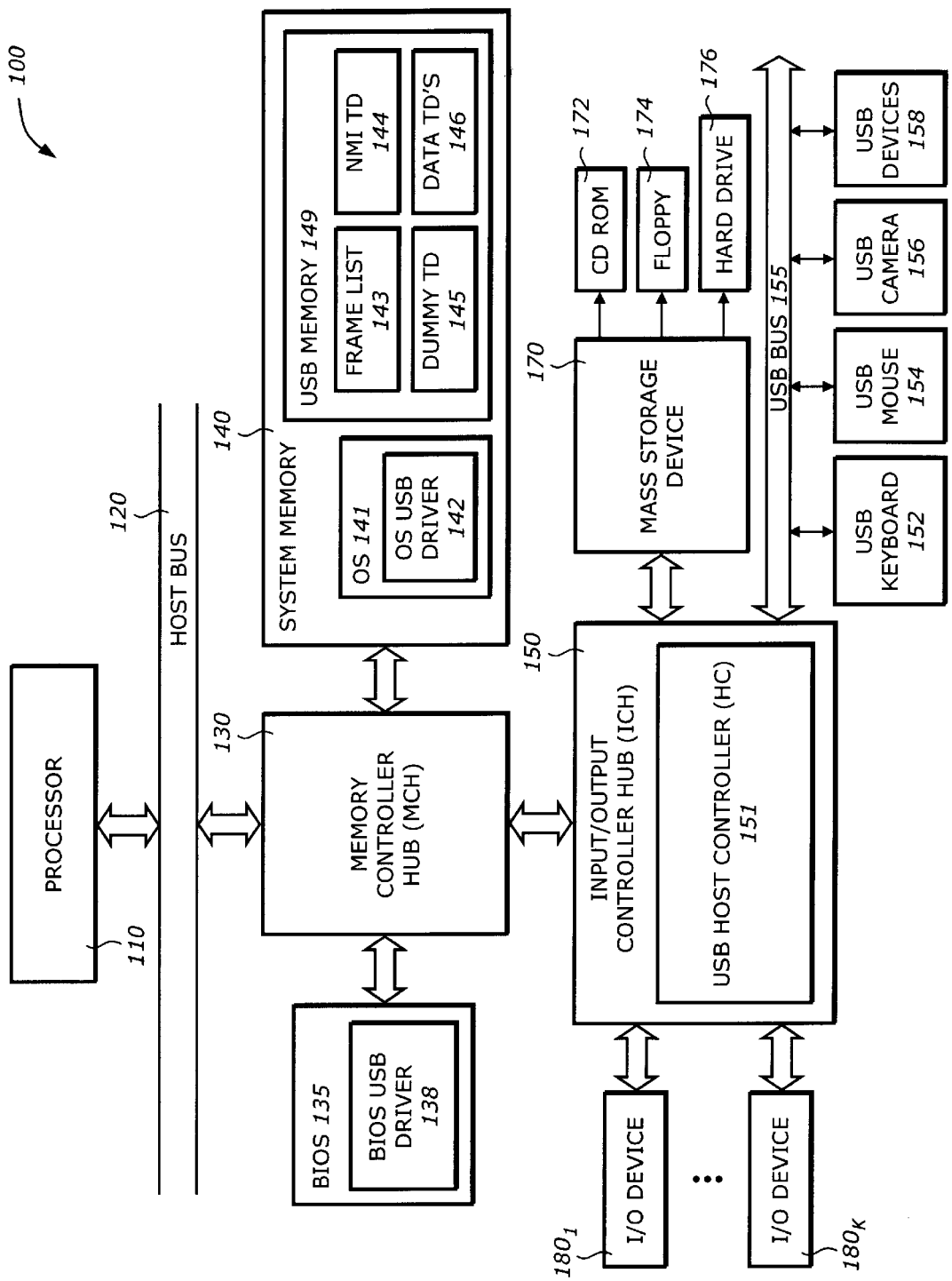
FIG. 1 is a diagram illustrating a system in which one embodiment of the invention can be practiced.

FIG. 1 is a diagram illustrating a computer system 100 in which one embodiment of the invention can be practiced. The computer system 100 includes a processor 110, a host bus 120, a memory control hub (MCH) 130, a Basic Input/Output System (BIOS) memory 135, a system memory 140, an input/output control hub (ICH) 150, a mass storage device 170, and input/output devices $180_1$ to $180_K$.

The processor 110 represents a central processing unit of any type of architecture, such as embedded processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. In one embodiment, the processor 110 is compatible with the Intel Architecture (IA) processor, such as the IA-32 and the IA-64. The processor 110 typical contains a number of control registers to support memory management tasks such as virtual memory and cache memory. These tasks may include paging and segmentation.

The host bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 maybe integrated into a chipset that integrates multiple functionalities such as the isolated execution mode, host-to-peripheral bus interface, memory control. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The BIOS memory 135 stores boot-up code and data. The BIOS memory 135 typically is implemented with non-volatile memory such as Read Only Memory (ROM), flash memory, and other similar memories. The BIOS memory 135 may also be stored inside the MCH 130. The BIOS memory 135 contains a BIOS USB driver 138 and other drivers.

The system memory 140 stores system code and data. The system memory 140 is typically implemented with dynamic random access memory (DRAM) or static random access memory (SRAM). The system memory may include program code or code segments implementing one embodiment of the invention. The system memory includes an Operating System (OS) 141 and USB memory 149. The OS 141 contains an OS USB driver 142. The USB memory 149 contains data structures and scratchpad data for controlling USB devices. Examples of these data structures include frame lists, transaction descriptors, queues, etc. In particular, the USB memory 149 includes a frame list 143, a non-maskable interrupt (NMI) transaction descriptor (TD) 144, and a dummy TD 145 and data TD's 146. The system memory 140 may also include other programs or data which are not shown, such as an operating system.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface, processor interface, interrupt controller, direct memory access (DMA) controller, power management logic, timer, universal serial bus (USB) interface, mass storage interface, low pin count (LPC) interface, etc. In particular, the ICH 150 includes a USB host controller (HC) 151 and interface to the USB bus 155. The USB host controller 151 contains a number of host controller registers as defined in the Universal Host Controller Interface (UHCI) Design Guide, Revision 1.1, published by Intel Corporation, March 1996. Examples of these registers include USB command register, USB status register, USB interrupt enable register, USB frame number register, USB frame list base address register, USB start of frame (SOF) register, USB Port 0 Status and Control register, and USB Port 1 Status and Control register. The USB bus 155 is coupled to a number of USB devices such as USB keyboard 152, USB mouse 154, USB camera 156, and other USB devices 158.

The mass storage device 170 stores archive information such as code, programs, files, data, applications, and operating systems. The mass storage device 170 may include compact disk (CD) ROM 172, floppy diskettes 174, and hard drive 176, and any other magnetic or optic storage devices. The mass storage device 170 provides a mechanism to read machine-readable media.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card, and any other peripheral controllers.

The present invention may be implemented by hardware, software, firmware, microcode, or any combination thereof. When implemented in software, firmware, or microcode, the elements of the present invention are the program code or code segments to perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

It is noted that the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Figure 2:
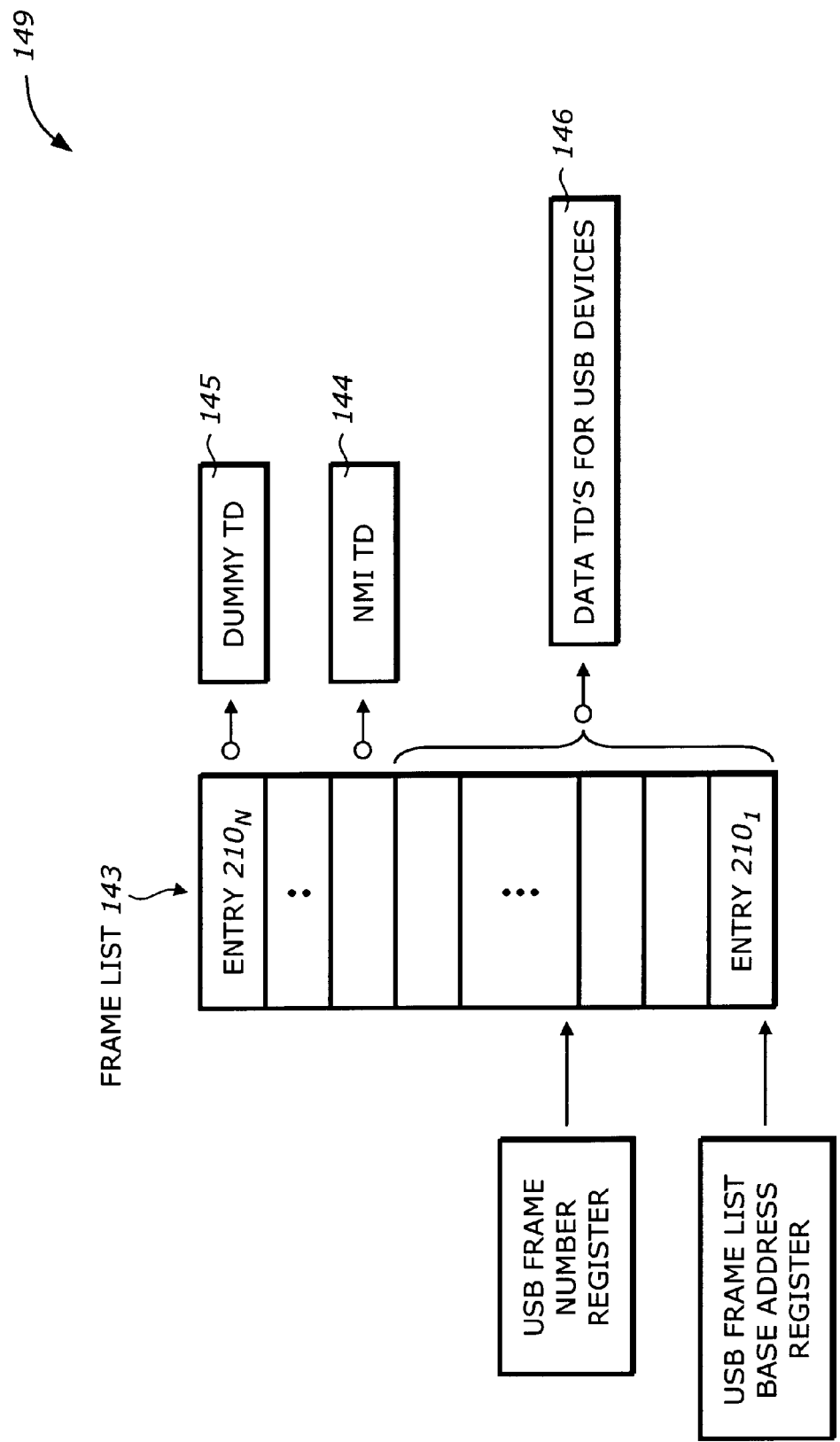
FIG. 2 is a diagram illustrating a frame list shown in FIG. 1 according to one embodiment of the invention.

FIG. 2 is a diagram illustrating the USB memory 149 shown in FIG. 1 according to one embodiment of the invention. The USB memory 149 includes the frame list 143, the NMI TD 144, the dummy TD 145, and the data TA's 146.

The frame list 142 includes a number of entries $210_1$ to $210_N$. The N entries $210_1$ to $210_N$ are addressed by the USB frame number stored in the USB frame number register in the host controller 151. Each of the N entries $210_1$ to $210_N$ corresponds to a frame number. In one embodiment, N is 1024 and each entry is composed of 4 bytes, corresponding to 4 KB of frame list. For USB devices, each entry corresponds to a particular frame of approximately 1 millisecond (ms). Each of the N entries $210_1$ to $210_N$ contains a pointer to other data structures (e.g., Transaction Descriptors, Queue Heads) and control bits. In particular, there is the non-maskable interrupt (NMI) TD 144, the dummy TD 145, and data TD's 146. The NMI TD 144 is used to indicate that the control transfer from the OS USB driver 142 (FIG. 1) to the BIOS USB driver 138 (FIG. 1) has been completed. The dummy TD 145 is used to provide rollback at 1 second interval. The data TD's 146 are used for the control and operation of the USB devices.

The base address of the frame list 143 is defined or provided by the USB frame list base address stored in the USB frame list base address register in the USB HC 151. By changing the USB frame list base address, it is possible to allow the USB HC 151 to access to a different frame list which points to different TD's.

The BIOS USB driver 138 or the OS USB driver 142 (FIG. 1) programs the Host Controller 151 with the starting address of the frame list in the USB frame list base address register and the Frame list index. Then, the driver causes the HC 151 to execute the schedule by setting the Run/Stop bit in the USB Control register to Run. The USB HC 151 then processes the schedule one entry at a time. Executing the schedule refers to fetching the entry and obtaining the Transaction Descriptor or the Queue Head. If the frame list entry indicates that it points to a TD, the HC 151 fetches the entry and begins the operations necessary to initiate a transaction on the USB.

The USB HC 151 provides interrupt capability based on two types: one is related to the execution of the transactions in the schedule, and one is related to the HC operation error. The transaction-based interrupts are maskable. These interrupts include Cyclic Redundancy Code (CRC) error or time-out, Interrupt on Completion, Short Packet Detect, Serial Bus Babble, Stalled, Data Buffer Error, and Bit Stuff Error The non-transaction based interrupts include Resume Receive, HC Process Error, and Host System Error. Out of these three non-transaction based interrupts, the HC Process Error and the Host System Error are non maskable. The NMI TD can be forced to be generated by using the HC Process Error interrupt. This HC Process Error can be created by using a non valid Packet Identifier (PID) or use a maximum length of greater than the allowable maximum value (e.g., 1280).

To set a positive flag that indicates a control transfer from the OS USB driver 143 to the BIOS USB driver has occurred, the OS USB driver can cause NMI to occur by restoring the previously saved USB HC registers and setting the HC to execute the USB schedule that contains the NMI. When the HC executes the NMI TD, a non-maskable interrupt is generated which can be converted into a legacy USB System Management Interrupt (SMI). On the occurrence of this interrupt, the HC 151 clears the Run/Stop bit which prevents further execution of the TD. The BIOS SMI handler then passes control to the BIOS USB driver 138. The BIOS USB driver 138 is therefore in control when the NMI is generated. Upon receiving control, the BIOS USB driver 138 reprograms the USB frame list base register to prevent or bypass execution of the NMI. Then the BIOS USB driver 138 can go through parsing the TD's in the frame list after positively confirming that the control is transferred from the OS USB driver 142. It is noted that the NMI TD is part of the BIOS-built USB schedule. The frame number that corresponds to the entry pointing to the NMI TD is known to the BIOS but not to the OS.

In other words, when the BIOS USB driver 138 is in control as a result of a legacy SMI caused by execution of an NMI TD, a positive detection of control transfer from the OS to the BIOS is achieved. To prevent or bypass execution of the NMI TD by the OS USB driver 142 when control is transferred to OS USB driver 142, the BIOS 138 re-programs the frame list base address to another frame list which does not point to the NMI TD.

Figure 3:
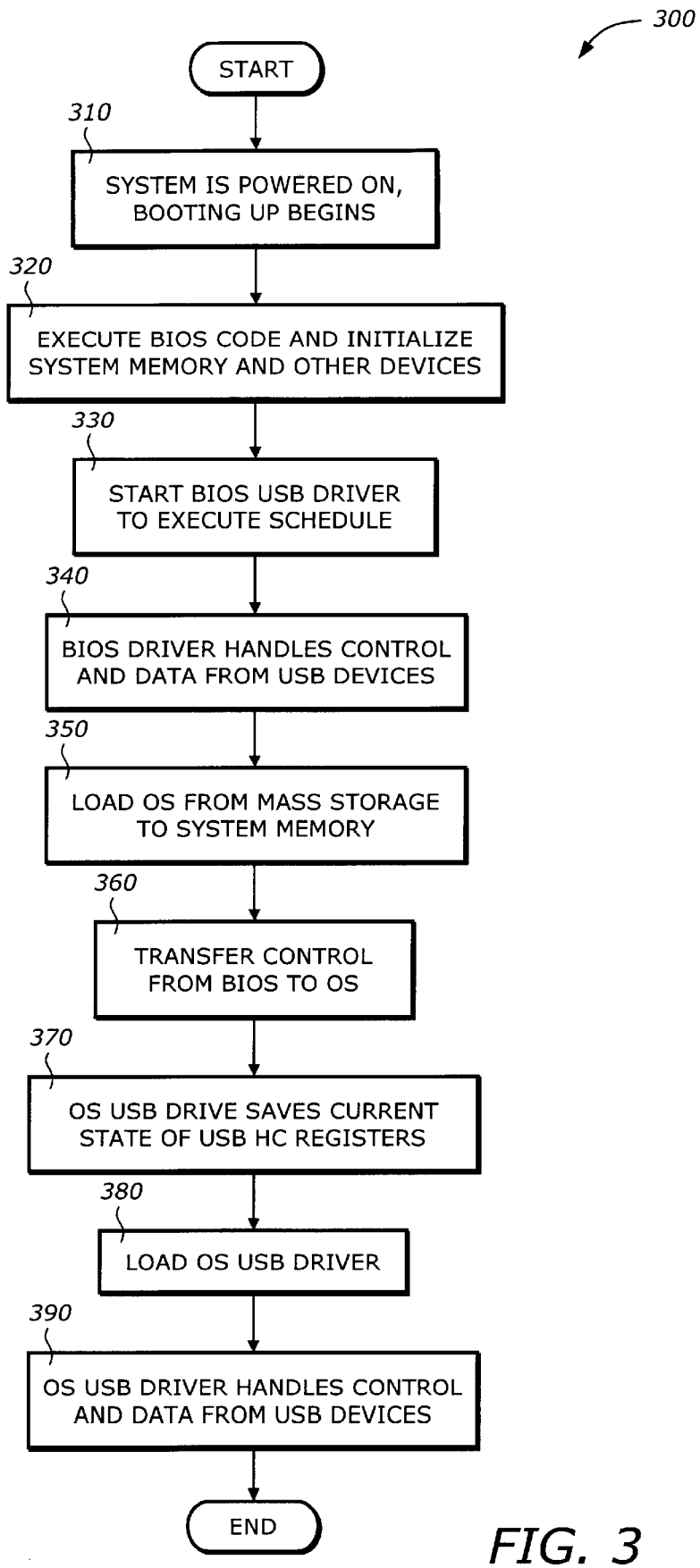
FIG. 3 is a flowchart illustrating a process to initialize USB operations during boot-up according to one embodiment of the invention.

FIG. 3 is a flowchart illustrating a process 300 to initialize USB operations during boot-up according to one embodiment of the invention.

Upon START, the system is powered on and the boot-up begins (Block 310). Next, the BIOS code starts execution and initializes system memory and other devices (Block 320). Then, the BIOS USB driver executes the USB schedule (Block 330). Next, the BIOS USB driver processes control and data from USB devices (Block 340).

Then, the BIOS loads the OS from mass storage to the system memory (Block 350). Next, the BIOS transfers control to the OS (Block 360). The OS USB driver then saves the current state of the USB host controller registers as initialized by the BIOS USB driver (Block 370). Next, the OS loads the OS USB driver (Block 380). The OS USB driver then handles control and data from the USB devices (Block 390). The process 300 is then terminated.

Figure 4:
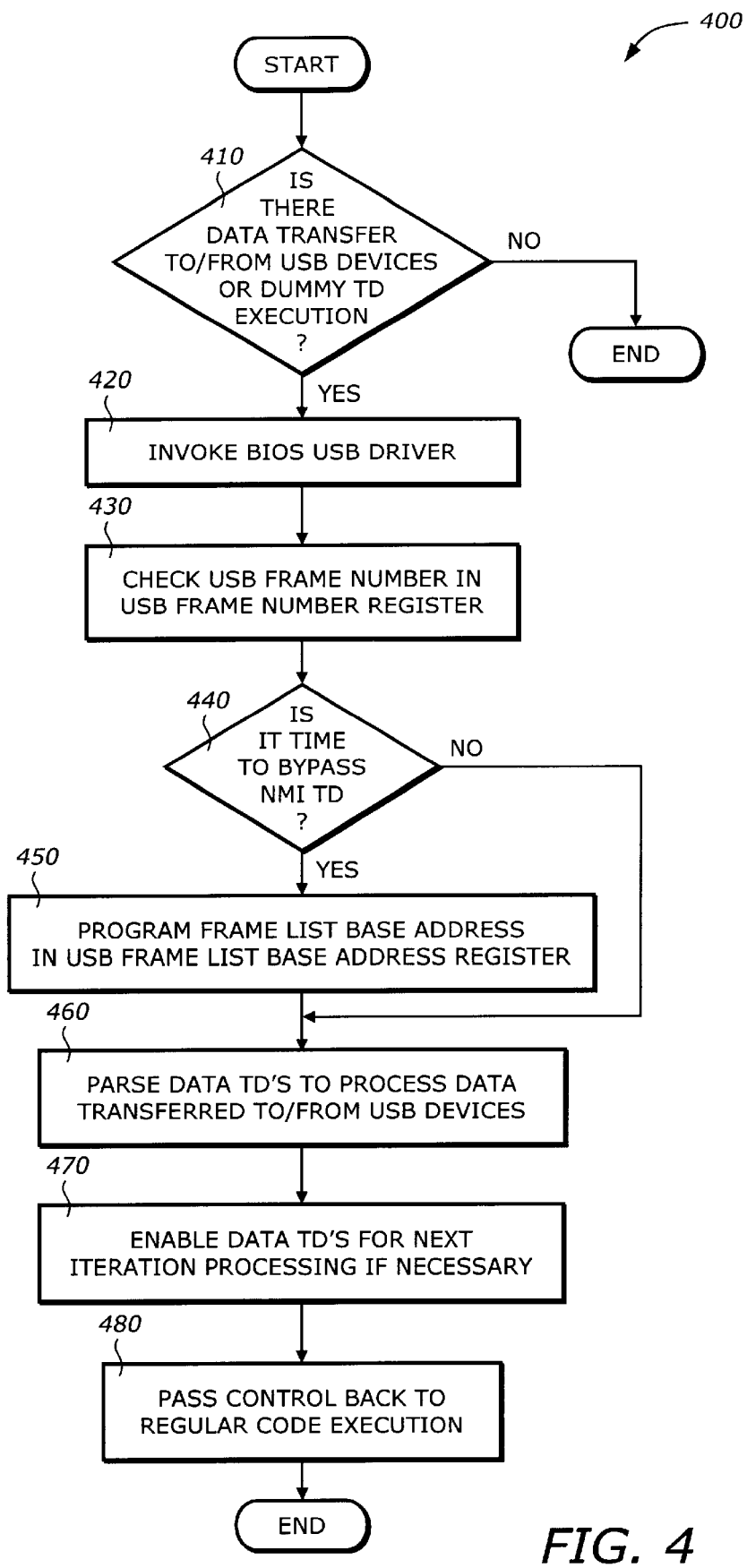
FIG. 4 is a flowchart illustrating a process to support USB operations by the BIOS USB driver during boot-up according to one embodiment of the invention.

FIG. 4 is a flowchart illustrating a process 400 to support USB operations by the BIOS USB driver during boot-up according to one embodiment of the invention.

Upon START, the process 400 determines if there is a data transfer to or from USB devices or if there is execution of dummy TD which occurs approximately every one second for rollback (Block 410). If no, the process 400 is terminated. Otherwise, the process 400 invokes the BIOS USB driver (Block 420). Then, the BIOS USB driver checks the USB frame number in the USB frame number register in the Host Controller (HC) (Block 430). From this USB frame number, the BIOS USB driver determines whether it is time to bypass the execution of the NMI TD (Block 440). If not, the process 400 goes to Block 460. Otherwise, the BIOS USB driver programs the frame list base address in the USB frame list base address register (Block 450). By changing the base address, the frame list is positioned at a different memory address from that contains the entry pointing to the NMI TD.

Next, the BIOS USB driver parses the data TD's to process the data transferred to or from the USB devices accordingly (Block 460). Then the BIOS USB driver enables the data TD's for the next iteration processing if necessary (Block 470). Next, the BIOS USB driver passes control back to the regular code execution (Block 480) and is then terminated.

Figure 5:
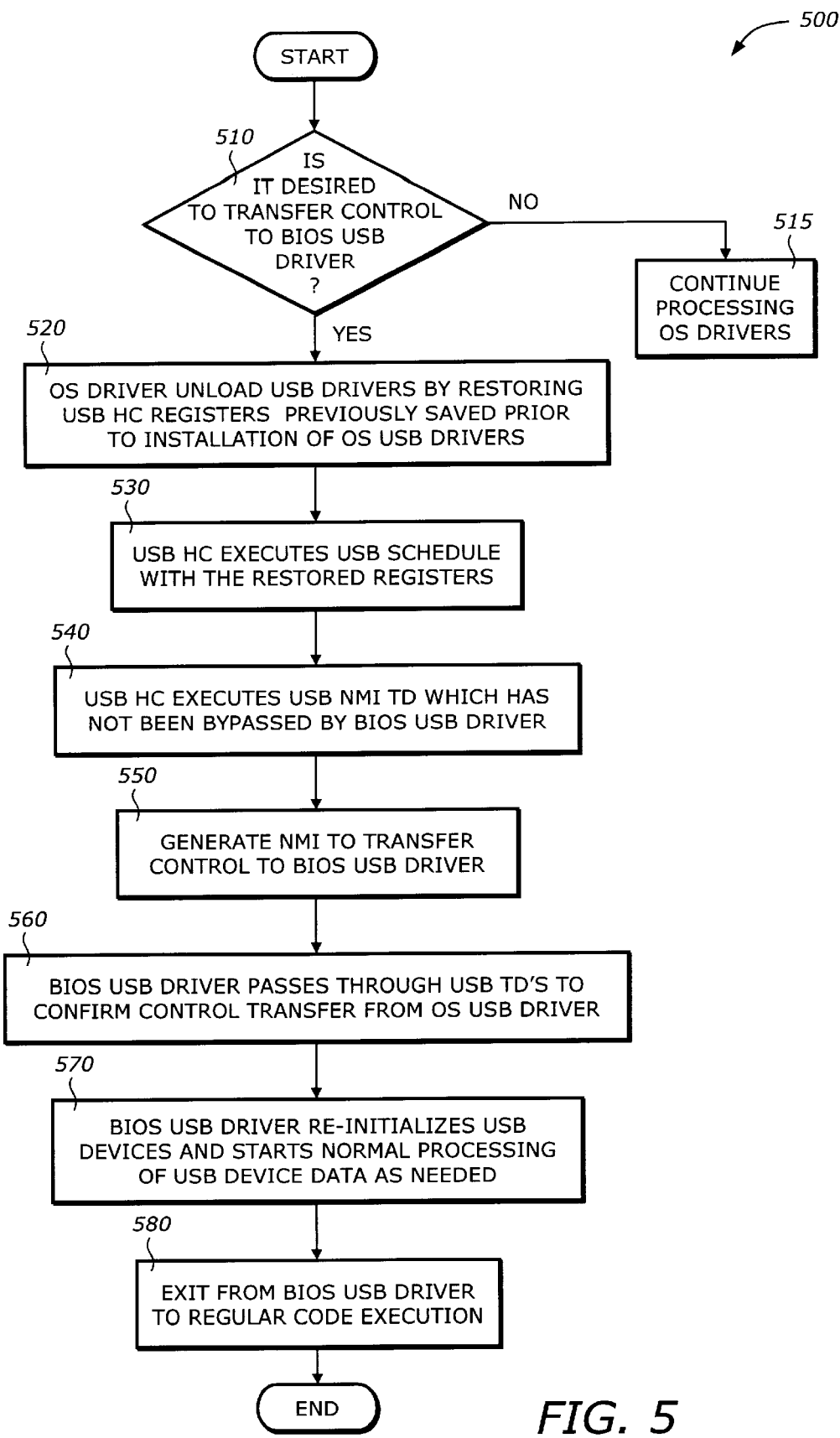
FIG. 5 is a flowchart illustrating a process to support USB operations by the OS USB driver during control transfer from OS to BIOS according to one embodiment of the invention.

FIG. 5 is a flowchart illustrating a process 500 to support USB operations by the OS USB driver during control transfer from OS to BIOS according to one embodiment of the invention.

Upon START, the process 500 determines if it is desire to transfer control from the OS USB driver to the BIOS USB driver (Block 510). Typically, this is provided by the user's selection of one of the following tasks: (1) restart to Microsoft-Disk Operating System (MS-DOS), (2) select "Shutdown of OS", and (3) unload OS USB drivers using device manager in the OS. If not, the process 500 continues execution of the OS USB drivers or other OS functions (Block 515) and is then terminated. Otherwise, the OS USB driver unloads the OS USB driver by restoring the USB HC registers previously saved prior to installation of the OS USB driver (Block 520).

Then, the USB HC executes the USB schedule using the restored registers (Block 530). Next, the USB HC executes the USB NMI TD which has not been bypassed by the BIOS USB driver (Block 540). Next, the process 500 generates the NMI as result of the execution of NMI TD to transfer control to the BIOS USB driver (Block 550). This NMI is redirected or converted to the legacy SMI which will be serviced by the BIOS SMI handler. The BIOS SMI handler then passes control to BIOS USB driver. When the BIOS USB driver takes control, it parses through the USB TD's to confirm the control transfer from OS USB driver (Block 560). After confirming, the BIOS USB driver re-initializes the USB devices and starts normal processing of USB device data as needed (Block 570). Then, the process 500 exits the BIOS USB driver and returns to regular code execution (Block 580) and is then terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
   a first driver to bypass execution of a transaction descriptor that causes a non-maskable interrupt (NMI) when executed by a host controller while under control of a second driver, the transaction descriptor being pointed to by an entry in a frame list, the host controller having a plurality of host controller registers including a frame list base address register defining a base address of the frame list and a frame number register addressing the entry.

2. The apparatus of claim 1 wherein first driver programs the frame list base address register based on a frame number in the frame number register.

3. The apparatus of claim 2 wherein the second driver restores the host controller registers before execution of the transaction descriptor that causes the NMI when a first control transfer from the second driver to the first driver occurs.

4. The apparatus of claim 3 wherein the host controller registers are saved when a second control transfer from the first driver to the second driver occurs.

5. The apparatus of claim 4 wherein the first driver parses the transaction descriptor that causes the NMI to confirm the first control transfer.

6. The apparatus of claim 5 wherein the first driver re-initializes devices controlled by the host controller after confirming the first control transfer.

7. The apparatus of claim 2 wherein the second driver is an Operating System (OS) driver.

8. The apparatus of claim 1 wherein the host controller is a Universal Serial Bus (USB) host controller.

9. The apparatus of claim 1 wherein the first driver is a Basic Input/Output System (BIOS) driver.

10. The apparatus of claim 1 wherein the NMI is a host controller process error.

11. A method comprising:
    bypassing execution of a transaction descriptor by a first driver, the transaction descriptor causing a non-maskable interrupt (NMI) when executed by a host controller while under control of a second driver, the transaction descriptor being pointed to by an entry in a frame list, the host controller having a plurality of host controller registers including a frame list base address register defining a base address of the frame list and a frame number register addressing the entry.

12. The method of claim 11 wherein bypassing comprises programming the frame list base address register based on a frame number in the frame number register.

13. The method of claim 12 further comprising restoring the host controller registers by the second driver before execution of the transaction descriptor that causes the NMI when a first control transfer from the second driver to the first driver occurs.

14. The method of claim 13 further comprising saving the host controller registers when a second control transfer from the first driver to the second driver occurs.

15. The method of claim 14 further comprising parsing the transaction descriptor that causes the NMI by the first driver to confirm the first control transfer.

16. The method of claim 15 further comprising re-initializing devices controlled by the host controller after confirming the first control transfer.

17. The method of claim 12 wherein the second driver is an Operating System (OS) driver.

18. The method of claim 11 wherein the host controller is a Universal Serial Bus (USB) host controller.

19. The method of claim 11 wherein the first driver is a Basic Input/Output System (BIOS) driver.

20. The method of claim 11 wherein the NMI is a host controller process error.

21. A computer program product comprising:
    a machine useable medium having computer program code embedded therein, the computer program product having:
    computer readable program code to bypass execution of a transaction descriptor by a first driver, the transaction descriptor causing a non-maskable interrupt (NMI) when executed by a host controller while under control of a second driver, the transaction descriptor being pointed to by an entry in a frame list, the host controller having a plurality of host controller registers including a frame list base address register defining a base address of the frame list and a frame number register addressing the entry.

22. The computer program product of claim 21 wherein the computer readable program code to bypass comprises computer readable program code to program the frame list base address register based on a frame number in the frame number register.

23. The computer program product of claim 22 further comprising computer readable program code to restore the host controller registers by the second driver before execution of the transaction descriptor that causes the NMI when a first control transfer from the second driver to the first driver occurs.

24. The computer program product of claim 23 further comprising computer readable program code to save the host controller registers when a second control transfer from the first driver to the second driver occurs.

25. The computer program product of claim 24 further comprising computer readable program code to parse the transaction descriptor that causes the NMI by the first driver to confirm the first control transfer.

26. The computer program product of claim 25 further comprising computer readable program code to re-initialize devices controlled by the host controller after confirming the first control transfer.

27. The computer program product of claim 21 wherein the first driver is a Basic Input/Output System (BIOS) driver.

28. The computer program product of claim 21 wherein the host controller is a Universal Serial Bus (USB) host controller.

29. The computer program product of claim 22 wherein the second driver is an Operating System (OS) driver.

30. The computer program product of claim 21 wherein the NMI is a host controller process error.

31. A system comprising:

a processor;

a host controller having a plurality of host controller registers including a frame list base address register and a frame number register;

a first storage coupled to the processor to store a first driver; and a second storage coupled to the processor to store a second driver;

wherein the first driver bypasses execution of a transaction descriptor that causes a non-maskable interrupt (NMI) when executed by the host controller while under control of the second driver, the transaction descriptor being pointed to by an entry in a frame list, the frame list base address register defining a base address of the frame list, the frame number register addressing the entry.

32. The system of claim 31 wherein first driver programs the frame list base address register based on a frame number in the frame number register.

33. The system of claim 32 wherein the second driver restores the host controller registers before execution of the transaction descriptor that causes the NMI when a first control transfer from the second driver to the first driver occurs.

34. The system of claim 33 wherein the host controller registers are saved when a second control transfer from the first driver to the second driver occurs.

35. The system of claim 34 wherein the first driver parses the transaction descriptor that causes the NMI to confirm the first control transfer.

36. The system of claim 35 wherein the first driver re-initializes devices controlled by the host controller after confirming the first control transfer.

37. The system of claim 32 wherein the second driver is an Operating System (OS) driver.

38. The system of claim 31 wherein the host controller is a Universal Serial Bus (USB) host controller.

39. The system of claim 31 wherein the first driver is a Basic Input/Output System (BIOS) driver.

40. The system of claim 31 wherein the NMI is a host controller process error.

* * * * *